3,320,294
PROCESS FOR MAKING MOLYBDENUM
ACETYLACETONATE
Melvin L. Larson, Royal Oak, Mich., assignor to American Metal Climax, Inc., New York, N.Y., a corporation of New York
No Drawing. Filed May 21, 1963, Ser. No. 282,135
6 Claims. (Cl. 260—429)

The present invention broadly relates to organometallic compounds and more particularly to an improved method for synthesizing molybdenum (III) beta-diketone complexes of which molybdenum (III) acetylacetonate and substituted acetylacetonates constitute the preferred products.

The principal object of the present invention is to provide a novel method for synthesizing and isolating molybdenum (III) beta-diketone complexes which is commercially practicable and yields the compounds in substantially high percentages.

Organometallic compounds and particularly organo-molybdenum compounds of a general type to which the present invention is applicable possess catalytic characteristics which make them adaptable for use as catalysts in various homogeneous solutions for polymerization, oxidation, hydrogenation, amination, hydration or epoxidation reactions, for example, which are of increasing importance in the chemical processing and petro-chemical industries. Molybdenum beta-diketone complexes have heretofore been synthesized in the laboratory by techniques which are not readily adaptable to high volume commercial processing equipment. In accordance with the discovery comprising the present invention, a satisfactory technique is disclosed for producing a family of molybdenum beta-diketone complexes in substantially high yields providing a sound basis for making these compounds available at reasonable cost in commercial quantities.

The family of trivalent molybdenum beta-diketone complexes which can be satisfactorily synthesized in accordance with the process comprising the present invention is predicated on the controlled reaction between molybdenum hexacarbonyl and beta-diketone compounds corresponding to the following formula:

$$R_1—CO—CH_2—CO—R_2$$

in which $R_1$ and $R_2$ are radicals selected from the group consisting of alkyl radicals having 1 to 8 carbon atoms, aryl radicals including phenyl, alkyl substituted aryls wherein the alkyl substituents thereon have 1 to 8 carbon atoms, the halogen substituted alkyl, aryl and alkyl-aryl derivatives thereof; as well as mixtures thereof.

Acetylacetone wherein $R_1$ and $R_2$ correspond to the methyl radical comprises the preferred compound of the family of beta-diketones enumerated above. The reaction of acetylacetone with molybdenum hexacarbonyl to form trivalent molybdenum acetylacetonate is exemplary of the chemical reactions between the other beta-diketones and molybdenum hexacarbonyl to form corresponding molybdenum beta-diketone complexes. Accordingly, while the process comprising the present invention will be described in detail in the connection with the synthesis of trivalent molybdenum acetylacetonate, it will be understood that the principles therein employed are equally applicable to the synthesis of other trivalent molybdenum complexes employing the alternative beta-diketones or mixtures thereof as hereinbefore set forth.

Molybdenum (III) acetylacetonate, tris (2,4-pentanediono) molybdenum (III),  $Mo(C_5H_7O_2)_3$, is a dark-purple, crystalline solid which has a melting point of about 228–229° C., is sublimable, and thermally decomposes when heated above its melting point. Molybdenum (III) acetylacetonate is monomeric in boiling benzene and is nonreactive toward Lewis bases (water, benzophenone, pyridine, and triphenylphosphine). Since the reaction product molybdenum (III) acetylactonate is subject to oxidation attack by oxygen, the synthesis of this compound must be conducted under an inert atmosphere such as a nitrogen atmosphere, for example, and subsequent separation, material transfer, and characterization of the product likewise must be made under an inert amosphere.

The process for making molybdenum (III) actylacetonate in accordance with one exemplary synthesis of the present invention relies on the interreaction between molybdenum hexacarbonyl and acetylacetone in a liquid reaction medium carried out under an inert atmosphere such as nitrogen, for example. In order to facilitate solution of the molybdenum hexacarbonyl in the acetylacetone solvent, the mixture is agitated and heated to a temperature from about 100° C. to about 160° C. and preferably to a temperature of about 140° C. to about 150° C. The resulting solution has a characteristic dark-orange color. The concentration of the molybdenum hexacarbonyl is controlled within a range of from about 0.005 mole up to about 0.20 mole per mole of acetylacetone. Concentrations of the molybdenum hexacarbonyl above about 0.10 mole are generally unsatisfactory due to the limited solubility of this constituent in the acetylacetone solvent. On the other hand, concentrations of the molybdenum hexacarbonyl constituent of less than about 0.05 mole per mole of the acetylacetone solvent provide excessively dilute solutions which are uneconomical from the standpoint of a commercial batch process. Accordingly, while concentrations ranging from 0.005 to 0.20 mole molybdenum hexacarbonyl can be employed, it is preferred that the concentration be maintained within a range of from about 0.05 to 0.10 mole per mole of acetylacetone. It is also contemplated within the scope of the present invention that the coreaction between the molybdenum hexacarbonyl and acetylacetone can be achieved on a continuous process cycle as well as on a batch cycle.

When concentrations of the molybdenum hexacarbonyl are employed within the ranges hereinabove set forth, there is a tendency of the molybdenum hexacarbonyl to sublime from the heated reaction mass causing formation of the sublimate on the cooler portions of the reaction vessel. Under such conditions the sublimate can periodically be removed and returned to the liquid reaction medium in which it dissolves and subsequently is reacted with the acetylacetone effecting a formation of the molybdenum (III) acetylacetonate. The completion of the coreaction between the molybdenum hexacarbonyl and acetylacetone solvent can readily be determined from the cessation of the formation of the sublimate on the cooler portions of the reaction vessel. At the completion of the reaction, the acetylacetone solvent can readily be separated from the molybdenum (III) acetylacetonate by vacuum distillation and the residual reaction product can be further purified, if desired, by sublimation.

In order to further illustrate the method hereinabove described for making molybdenum (III) acetylacetonate, the following example is provided. It will be understood that the example is provided solely for illustrative purposes and is not intended to be limiting of the method as herein disclosed and as set forth in the subjoined claims.

*Example I*

A reaction mixture was prepared comprising 19.47 grams (0.0738 mole) of molybdenum hexacarbonyl which was of a substantially pure state and which was admixed with 100 milliliters (97.53 gm., 0.975 mole) of acetylacetone. The mixture was stirred and gradually heated to a temperature of 150° C. over a period of 1½ hours. Complete solution of the molybdenum hexacarbonyl was achieved resulting in a solution having a dark-orange color. During the solution of the molybdenum hexacarbonyl, unreacted portions thereof began to sublime and sublimate accumulated on the cooler portions on the reaction flask. The temperature of the reaction mixture was maintained within a range of 150–155° C. for a period of 6 hours during which the accumulated sublimate was periodically returned to the liquid reaction mass for completion of the reaction. The entire reaction was carried out under a prepurified nitrogen atmosphere.

At the completion of the 6-hour reaction period, the reaction was adjudged complete as evidenced by the cessation of the sublimation of molybdenum hexacarbonyl. The reaction mixture was then cooled and vacuum evaporated to dryness employing an oil-vacuum pump while the reaction mass was gradually heated to 96° C. The resultant dry reaction product was thereafter further purified by sublimation by first cooling the flask and providing it with a cold condensing surface on which the sublimate accumulated under vacuum conditions. The reaction product was sublimed for a period of 7 to 8 hours at a temperature of 170–180° C. and a total of 27.08 gm. of dark-purple crystals comprising 93% yield was accumulated.

The resulting purified product was determined to have a melting point of 225–226° C. The elemental composition of the material based on a formula of $C_{15}H_{21}MoO_6$ was found to be: C, 44.87; H, 5.25; Mo, 23.80 in comparison to a calculated elemental composition of: C, 45.81; H, 5.38; Mo, 24.30.

The reaction product was also submitted to infrared spectrographic analysis employing a Perkin-Elmer model 21 instrument in which the sample was prepared as a KBr disc and a Nujol mull in a nitrogen atmosphere and run in a sealed cell. The infrared absorption spectrum obtained corresponds to those obtained for acetylacetonates of trivalent metal ions.

The foregoing analytical data obtained on the dark-purple crystalline reaction product clearly establish its identity as molybdenum (III) acetylacetonate.

The synthesis of other trivalent molybdenum beta-diketone complexes is similarly achieved employing a liquid reaction medium in which the molybdenum hexacarbonyl reacts with a specific beta-diketone or mixtures thereof to produce the desired molybdenum complex product. The mole ratio of the beta-diketone compound to the molybdenum hexacarbonyl is controlled within the ranges hereinbefore set forth in connection with acetylacetone to provide an excess over the theoretical quantity required to achieve relatively high percentage yields. Due to variations in the physical properties and solubility characteristics of the beta-diketones, binary and tertiary inert compatible solvent systems can be employed to effect solution of the reactive ingredients enabling interreaction therebetween.

While it will be apparent that the preferred embodiments herein illustrated are well calculated to fulfill the objects above stated, it will be appreciated that the invention is susceptible to modification, variation and change without departing from the proper scope or fair meaning of the subjoined claims.

What is claimed is:
1. A method of making molybdenum (III) beta-diketone complexes which comprises the steps of forming a liquid reaction medium containing molybdenum hexacarbonyl and a beta-diketone compound corresponding to the formula:

in which $R_1$ and $R_2$ are radicals selected from the group consisting of alkyl radicals having 1 to 8 carbon atoms, aryl radicals including phenyl, alkyl substituted aryls wherein the alkyl substituents thereon have 1 to 8 carbon atoms, the halogen substituted alkyl, aryl, and alkyl-aryl derivatives thereof; as well as mixtures thereof; agitating said reaction medium under an inert atmosphere for a period of time sufficient to effect formation of a molybdenum (III) beta-diketone complex, and thereafter isolating said molybdenum (III) beta-diketone complex from the reaction medium.

2. A method of making molybdenum (III) acetylacetonate which comprises the steps of dissolving molybdenum hexacarbonyl in acetylacetone and enabling a reaction to occur under an inert atmosphere between the constituents for a period of time sufficient to assure formation of molybdenum (III) acetylacetonate, and thereafter isolating the molybdenum (III) acetylacetonate from the remaining unreacted acetylacetone.

3. A method of making molybdenum (III) acetylacetonate which comprises the steps of dissolving molybdenum hexacarbonyl in acetylacetone in the proportions ranging from about 0.005 to about 0.20 mole molybdenum hexacarbonyl per mole of acetylacetone, heating the resulting mixture in an inert atmosphere and enabling a reaction to occur between the constituents for a period of time sufficient to assure formation of molybdenum (III) acetylacetonate, and thereafter isolating the molybdenum (III) acetylacetonate from the remaining unreacted acetylacetone.

4. A method of making molybdenum (III) acetylacetonate which comprises the steps of dissolving molybdenum hexacarbonyl in acetylacetone in the proportions of from about 0.005 to about 0.20 mole of molybdenum hexacarbonyl per mole of acetylacetone, heating the mixture in an inert atmosphere to a temperature ranging from about 100° C. to about 160° C. for a period of time sufficient to effect formation of molybdenum (III) acetylacetonate, and thereafter isolating the molybdenum (III) acetylacetonate from the remaining unreacted acetylacetone.

5. A method of making molybdenum (III) acetylacetonate which comprises the steps of dissolving molybdenum hexacarbonyl in acetylacetone in the proportions of from about 0.05 to about 0.10 mole of molybdenum hexacarbonyl per mole acetylacetone, heating the mixture in an inert atmosphere to a temperature of from about 100° C. to about 160° C. for a period of time sufficient to effect formation of molybdenum (III) acetylacetonate, and thereafter isolating the molybdenum (III) acetylacetonate from the remaining unreacted acetylacetone.

6. A method of making molybdenum (III) acetylacetonate which comprises the steps of dissolving molybdenum hexacarbonyl in acetylacetone in the proportions ranging from about 0.05 to about 0.10 mole of molybdenum hexacarbonyl per mole acetylacetone, heating the resultant mixture in an inert atmosphere to a temperature of from about 140° C. to about 150° C. for a period of time sufficient to effect a reaction and the formation of molybdenum (III) acetylacetonate, and thereafter isolating the molybdenum (III) acetylacetonate from the remaining unreacted acetylacetone.

References Cited by the Examiner

Larson et al., "Inorganic Chemistry," vol. 1, No. 4, November 1962, p. 858.

TOBIAS E. LEVOW, *Primary Examiner.*

H. M. S. SNEED, *Assistant Examiner.*